Feb. 16, 1932.   H. H. CRAWFORD   1,845,484
THERMOSTATICALLY CONTROLLED SHUTTER
Filed Oct. 7, 1929    2 Sheets-Sheet 1
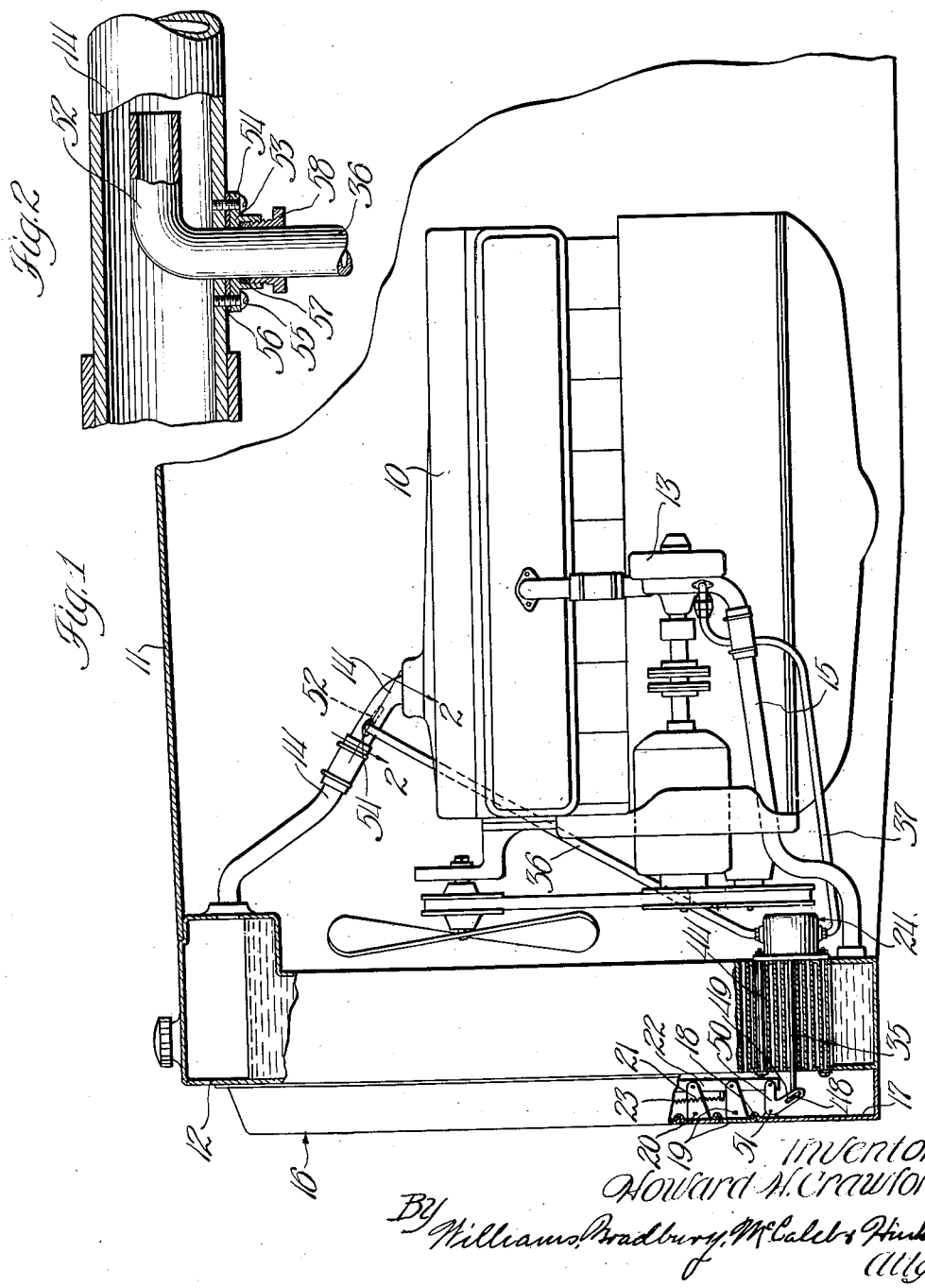
Inventor:
Howard H. Crawford
By Williams, Bradbury, McCaleb & Hinkle
Attys.

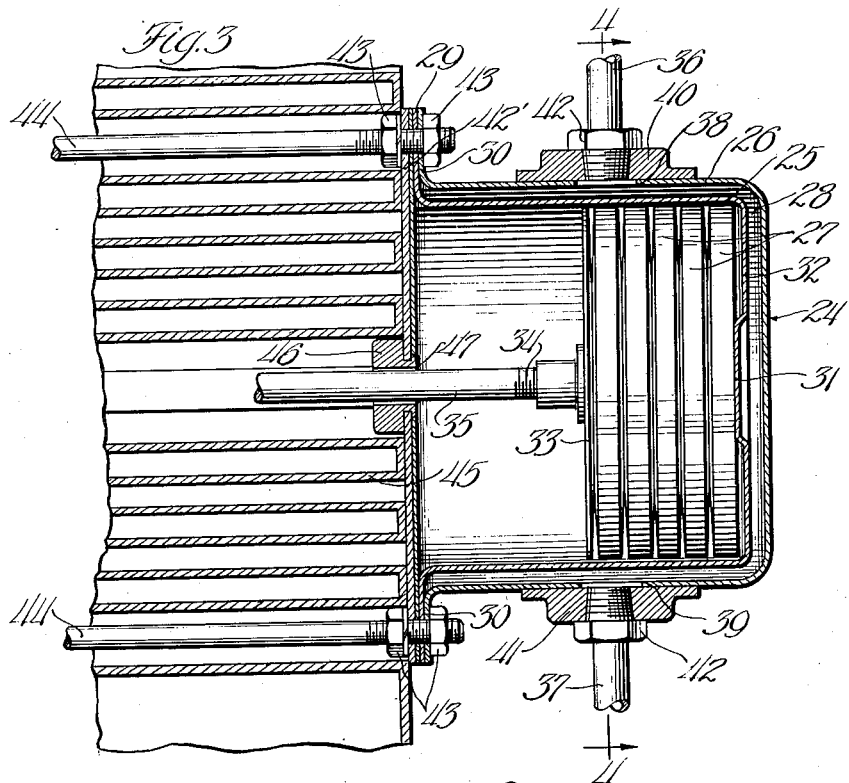
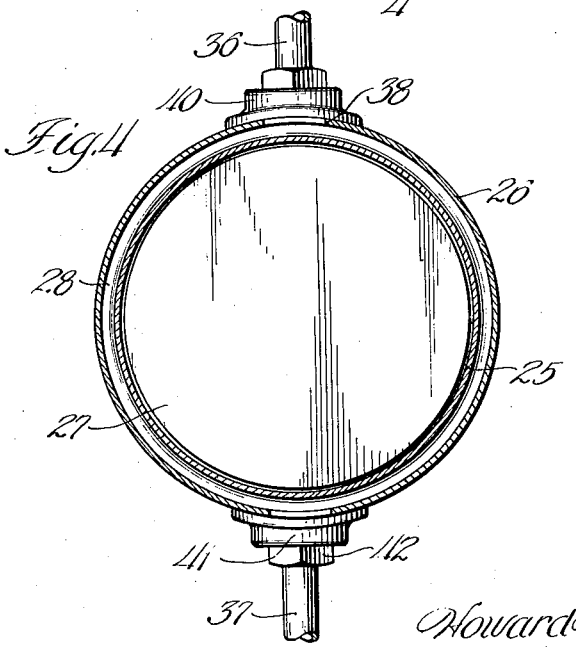

Patented Feb. 16, 1932

1,845,484

UNITED STATES PATENT OFFICE

HOWARD H. CRAWFORD, OF DETROIT, MICHIGAN, ASSIGNOR TO PINES WINTERFRONT COMPANY, OF CHICAGO, ILLINOIS, A CORPORATION OF DELAWARE

THERMOSTATICALLY CONTROLLED SHUTTER

Application filed October 7, 1929. Serial No. 397,895.

The present invention relates to thermostatically controlled shutters, and is particularly concerned with shutters for controlling the flow of cooling air through the radiators of internal combustion engines.

One of the objects of the present invention is the provision of an improved thermostatically controlled shutter device which is more sensitive and more quickly responsive to the temperature conditions of the engine, and which has improved operating characteristics.

In the thermostatic shutters of the prior art, it has been necessary to locate the thermostat in that part of the water cooling system where the water of the desired operating temperature is located, but this imposes certain restrictions of design on the manufacturer, and the prior devices can only be responsive to water at one point in the system. When the thermostat is located at the hottest part of the system in the prior devices there is a possibility of the freezing of the water in the coldest part of the system.

It is also very desirable that the controlling devices be adapted to open the shutters very quickly when the engine has reached a predetermined operating temperature, and that the shutters be closed very quickly as soon as the engine has stopped, but considerable time is required for the cooling of the ordinary thermostatic devices of the prior art when they are located in such manner as to be responsive to the temperature conditions of the engine or the liquid of the cooling system.

Another object of the present invention is the provision of a thermostatic control for radiator shutters, which is adapted to open the shutters promptly at a predetermined operating temperature and to close the shutters soon after the engine has stopped to conserve the heat of the engine.

Another object is to provide a system in which the shutter controlling thermostat is responsive to the temperature of some of the hottest liquid in the cooling system when the engine is in operation, and responsive to the temperature of some of the coolest liquid in the system when the engine is at rest.

Another object is the provision of a thermostatic controlling device which may be mounted at any convenient point upon the engine radiator or any part of the power plant; that is, a control device which need not necessarily be mounted at any definite point upon or with respect to the radiator with which its controlled shutters are associated.

Other objects of the invention are to utilize the suction of a liquid circulating pump, and the pressure of the cooling liquid flowing from the engine water jackets to the radiator, to maintain a continuous supply of hot liquid flowing to and from the thermostat when the engine is in operation, and to utilize the siphoning effect of the liquid circulating system to draw colder water into contact with the thermostat when the engine stops.

Other objects and advantages of the invention will be apparent from the following description and from the accompanying drawings in which similar characters of reference indicate similar parts throughout the several views.

Referring to the drawings, of which there are two sheets;

Fig. 1 is a diagrammatic elevational view of an internal combustion engine equipped with a temperature regulating system according to the present invention;

Fig. 2 is a sectional view of the conduit leading from the top of the water jacket showing the means for directing the liquid from the circulating system into the conduit leading to the thermostat chamber taken on the line 2—2 of Fig. 1;

Fig. 3 is a vertical sectional view on a larger scale taken through the thermostatic device and a portion of the radiator core;

Fig. 4 is a sectional view taken on the plane of the line 4—4 of Fig. 3.

The embodiment which has been selected to illustrate the invention includes an internal combustion engine 10, which is enclosed in the usual hood 11, and provided with a water circulating system including a radiator 12. The engine is provided with a water circulating system which includes the water jacket about the engine 10, a pump 13, the radiator 12 and conduits 14 and 15, connecting the water jacket and the radiator at the bottom and top of the system respectively. The pump 13 may be actuated from the internal combustion engine 10 in any convenient way, and the pump is preferably located in a lower part of the circulation system between the conduit 15 and the water jacket of the engine 10.

The shutter device 16 of the present embodiment comprises a detachable radiator shutter consisting of a shutter frame 17, which is formed with a centrally located opening 18 for the passage of air through the core of the radiator 12, and the opening 18 is adapted to be closed by a plurality of shutters 19, which are pivotally mounted on the frame at the points 20. Each of the shutters is provided with actuating means consisting of a rearwardly extending arm 21, and the arms 21 of the shutters are pivotally connected to a shutter actuating bar 22, so that all of the shutters, or a group thereof, may be opened or closed at the same time. In the preferred embodiment, the shutters 19 are urged to closed position by a spring 23 tensioned between the shutter bar 22 and the frame 17, and urging the shutter bar 22 upward so that the shutter 19 may be opened by movement of the shutter bar 22 downward against the tension of the spring 23.

It should be understood that the specific details or construction of the engine or shutters may be varied infinitely without affecting the merits of the invention, and the present invention is equally applicable to built-in shutters as well as the detachable shutters of the type illustrated.

Referring to Figs. 3 and 4, the thermostatic device which is indicated in its entirety by the numeral 24, preferably comprises an inner casing 25 and an outer casing 26 adapted to provide a support for a plurality of thermostatic wafers 27, and to provide an annular liquid chamber 28 about said thermostatic wafers. As the ordinary thermostatic wafers are usually circular in form, the inner and outer chambers 25, 26 may be cylindrical sheet metal members of substantially the same shape, each having an outwardly extending annular attaching flange 29, 30, but the inner chamber 25 is preferably formed with a centrally located stamped protuberance 31 adapted to provide a bearing surface for the central portion of the thermostatic wafer, which is located at that end of the chamber. Any number of thermostatic wafers may be employed, depending upon the amount of expansive movement required or the amount of force to be generated, and the thermostatic wafers 27 are confined between the end 32 of the inner chamber and the bearing plate 33, adjustably carried by the threaded end of an actuating rod 35.

The thermostatic wafers may be of any conventional type, but preferably consist of flexible metal members filled with a highly volatile fluid adapted to expand upon the application of heat. Since the inner chamber 25 is of less diameter than the outer chamber 26, an annular space 28 is left between two chambers and the annular space 28 is in communication with the water circulating system by means of the conduits 36, 37.

The outer chamber 26 is, therefore, provided with apertures 38 and 39, about which are secured by welding or other convenient fastening means, metal fittings 40, 41 which are threaded to receive the nipples 42 which secure the conduits 36, 37 to the fittings 40, 41.

The annular flange 29 carried by the inner chamber 25 is preferably of greater width than the flange 30, so that when the two metal chambers 25, 26 are disposed, as shown in Fig. 3, the flanges 29, 30 and the cover 42' may be secured together by means of nuts 43 on the screw bolts 44 which secure the thermostatic device 24 to the radiator core. The cover 42 is preferably provided with a guide 46 having an elongated bore 47 for slidably receiving the actuating rod 35 and when the thermostatic device 24 is carried by the radiator core, the rod 35 passes through one of the apertures or interstices usually intended for the passage of air.

The outer end of the rod 35 is bent laterally to provide a bearing 48 adapted to slidably engage in a slot 49 formed in one of the arms of a bell crank 50. The other arm of the bell crank 50 is pivotally connected to the shutter actuating bar 22 and the bell crank is pivotally mounted on the frame at 51.

It will thus be observed that when the thermostatic wafers 27 expand, the wafers react against the bearing surface 31 of the inner casing 25 and force the rod 35 to the left in Figs. 1 and 3, rotating the bell crank 50 in a clockwise direction and moving the shutter actuating bar 22 downward against the tension of the spring 23 to open the shutters 19. The spring 23 maintains the plate 33 in engagement with the thermostats 27, and also maintains the shutters in closed position at temperatures below the critical operating temperature.

The conduit 37 leading from the lower part of the annular chamber 28 about the thermostats 27. is in communication with the liquid circulating system at a point just below the pump 13; that is to say, on the suction side of the pump. The conduit 36 is also in communication with the liquid circulating system of the engine 10 at a point located adjacent the upper part of the water jacket, and in the present embodiment, the conduit 36 projects into a part of the conduit 14. The conduit 36 is preferably provided with means for directing the flowing liquid into the conduit 36, which may consist of a laterally turned portion 52 located in the conduit 14 and pointing in the direction opposite to the flow of the liquid.

The end 52 of conduit 36 is, of course, smaller than the conduit 14, so that only a portion of the liquid passing through conduit 14 is directed into the conduit 36 and conducted to the annular chamber 28 about the thermostats 27. The flow of liquid in the conduit 36 is the result of the pressure developed by the velocity head in the conduit 14 by the pump 13, and also the result of the pressure or suction generated in conduits 36, 37 by the pump 13.

In the present embodiment, the pipe 14 is provided with a fitting 53 having curved attaching flanges 54, which are secured to the pipe 14 by screw bolts 55 with a gasket 56 between the flanges 54 and the pipe 14 to prevent leakage. The metal conduit 36 may be secured in the fitting 53 by the use of a soft metal gasket 57, which is compressed in an annular space in the fitting 53 by the gland 58 which is threaded into the fitting.

The operation of the temperature regulating system of the present invention is as follows:

When the engine is at rest and cold, the shutters 19 are maintained in closed position by the spring 23. As soon as the engine starts, the water in the circulating system is heated by the combustion in the engine, and the water is caused to circulate by the pump 13. A portion of the hottest water from the engine, which would naturally be located at the top of the water jacket, is diverted from the conduit 14 through the conduit 36 to the liquid chamber about the thermostats 27, but the shutters are maintained in closed position until the engine has reached a predetermined operating temperature.

The temperature at which the thermostats 27 will be actuated corresponds more closely to the temperature of the hottest water in the circulating system when the engine is operating, because the thermostat is subjected to heat from a portion of the hottest water and the return conduit 37 being in communication with the pump 13, tends to maintain the circulation of liquid in the liquid chamber 28 of the thermostats, so that the shutters will be moved to open position promptly as soon as the hottest water reaches the predetermined temperature.

While the engine is in operation the conduit 14 is ordinarily filled with the cooling liquid which is discharged into the upper part of the radiator 12, but as soon as the engine stops and the generation of pressure by the pump 13 ceases, the cooling liquid settles backward in the conduit 14 and in the upper part of the water jacket.

At the same time, it has been discovered that a siphoning effect takes place within the circulating system, including the conduits 15 and 36, so that liquid is drawn upward in the conduit 36 and from the pump 13 in the conduit 15, and a portion of the coldest liquid of the cooling system is siphoned back into the thermostatic chamber 28 and the thermostat is subjected to the temperature of the coldest liquid. This effects a substantial decrease in the time required for the cooling of the thermostats 27, and the shutters will be closed soon after the engine ceases operating so as to conserve most of the heat of the engine.

It will thus be observed that I have invented a new system of temperature regulation for internal combustion engines, including thermostatically controlled means for regulating the flow of cooling air, and the thermostatic controlling devices are adapted to be subjected to a part of the hottest liquid in the system while the engine is operating, and a part of the coolest liquid in the system when the engine is at rest.

The present thermostatic device may be located on any part of the power plant and provided with operative mechanical connections to the shutters as well as the necessary conduits for connecting the liquid chamber to the circulating system.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States is:

1. In a temperature regulation system for internal combustion engines, the combination of a circulating system with a thermostat for controlling a radiator shutter, means for conveying hot liquid from said system to said thermostat during the operation of said engine, and means for withdrawing heated liquid from said thermostat when said engine stops, to permit the cooling of said thermostat.

2. In a temperature regulation system for internal combustion engines, the combination of a circulating system with a thermostat for controlling a radiator shutter, means for conveying hot liquid from said system to said thermostat during the operation of said engine, and means for withdrawing heated liquid from said thermostat when said engine stops, to permit the cooling of said thermostat, said means comprising a circulating pump and conduits to said thermostat from both sides of said pump.

3. In a temperature regulation system for internal combustion engines, the combination of a circulating system with a thermostat for controlling a radiator shutter, said thermostat being responsive to the temperature of water from the top of said circulating system when said engine is operating and to the temperature of water from the bottom of said circulating system when said engine is at rest.

4. In a temperature regulation system for internal combustion engines, the combination of an engine having a liquid cooling system including a radiator and a pump, with a shutter device for controlling the flow of cooling air, a thermostat for controlling said shutter device, said thermostat being responsive to the temperature of the hottest liquid in the system when the engine is in operation and responsive to the temperature of the coolest liquid in the system when the engine is at rest.

5. In a temperature regulation system for internal combustion engines, the combination of an engine having a liquid cooling system including a radiator and a pump, with a shutter device for controlling the flow of cooling air, a thermostat for controlling said shutter device, and connections between said pump and thermostat whereby said pump is adapted to create a flow of liquid to said thermostat.

6. In a thermostatically controlled radiator shutter, the combination of an engine having a liquid circulating system, with a shutter means, a thermostat for actuating said shutters, a liquid chamber about said thermostat, and operative mechanical connections between said thermostat and shutters, said thermostat being responsive to the temperature of water drawn from the lower part of said system when said engine is at rest.

7. In a thermostatically controlled radiator shutter, the combination of an engine having a liquid circulating system, with a shutter means, a thermostat for actuating said shutters, a liquid chamber about said thermostat, and operative mechanical connections between said thermostat and shutters, said thermostat being responsive to the temperature of water drawn from the lower part of said system when said engine is at rest, and responsive to the temperature of water from an upper part of said circulating system when said engine is operating.

8. A heat regulating system for an internal combustion engine, comprising a liquid circulating system including a radiator, a pump, and a water jacket, a plurality of shutters for controlling the flow of cooling air through said radiator, and a thermostatic device adapted to be carried at any point on said engine and responsive to the temperature of the coolest part of the liquid in the circulation system on stopping of the engine.

9. A heat regulating system for an internal combustion engine, comprising a liquid circulating system including a radiator, a pump, and a water jacket, a plurality of shutters for controlling the flow of cooling air through said radiator, a thermostatic device adapted to be carried at any point on said engine and responsive to the temperature of the coolest part of the liquid in the circulation system on stopping of the engine, and a separate liquid chamber about said thermostat.

10. A heat regulating system for an internal combustion engine, comprising a liquid circulating system including a radiator, a pump, and a water jacket, a plurality of shutters for controlling the flow of cooling air through said radiator, a thermostatic device adapted to be carried at any point on said engine and responsive to the temperature of the coolest part of the liquid in the circulation system on stopping of the engine, a separate liquid chamber about said thermostat, and a conduit from said liquid chamber to an upper part of said water jacket, said conduit having a part projecting into the stream of circulating liquid to direct liquid into said chamber.

11. A heat regulating system for an internal combustion engine, comprising a liquid circulating system including a radiator, a pump, and a water jacket, a plurality of shutters for controlling the flow of cooling air through said radiator, a thermostatic device adapted to be carried at any point on said engine and responsive to the temperature of the coolest part of the liquid in the circulation system on stopping of the engine, a separate liquid chamber about said thermostat, a conduit from said liquid chamber to an upper part of said water jacket, said conduit having a part projecting into the stream of circulating liquid to direct liquid into said chamber, and another conduit leading from said liquid chamber to the suction side of said pump.

12. A heat regulating system for an internal combustion engine, comprising a liquid circulating system including a radiator, a pump, and a water jacket, a plurality of shutters for controlling the flow of cooling air through said radiator, a thermostatic device adapted to be carried at any point on said engine and responsive to the temperature of the coolest part of the liquid in the circulation system on stopping of the engine, said thermostatic device being adapted to open said shutters, and resilient means for closing said shutters.

13. A shutter device for attachment to an internal combustion engine, comprising a shutter frame, a plurality of shutters, a thermostat, a pair of metal members about said thermostat forming an annular liquid chamber, operative mechanical connections from said thermostat to said shutters, and a pair of conduits for connecting said chamber to the upper part and lower part of a water circulating system.

14. In a shutter device for engines, the combination of a plurality of shutters with a thermostatic device for controlling said shutters, a casing about said thermostatic device, and a plurality of conduits for connecting said casing to the water cooling system of said engine and subjecting said thermostatic device to the hottest water in said system under running conditions and to the coldest water when said engine is not running.

15. In a heat regulating device for internal combustion engines, the combination of a thermostat for controlling a heat regulator, with a casing for enclosing the thermostat, a conduit leading from said casing to the upper part of the water system to conduct hot water to the casing when the engine is running and a conduit from said casing to one of the low parts of the water system to siphon back cold water to said casing when the engine stops.

In witness whereof, I hereunto subscribe my name this 30 day of Sept., 1929.

HOWARD H. CRAWFORD.